May 6, 1941.　　M. F. A. JULIEN ET AL　　2,241,139
ENGINE UNIT MOUNTING
Filed March 24, 1937　　7 Sheets-Sheet 1

M. F. A. Julien
J. F. Paulsen
Inventors

By Glascock Downing & Seebold
Attys

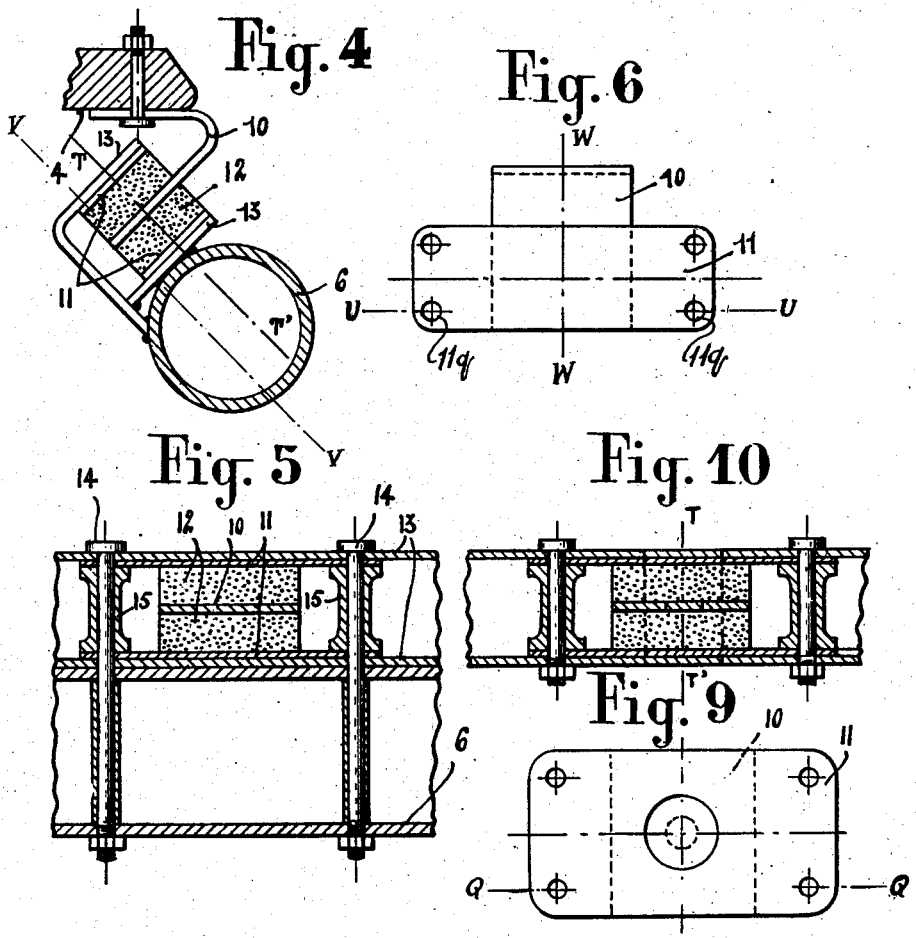

May 6, 1941. M. F. A. JULIEN ET AL 2,241,139
ENGINE UNIT MOUNTING
Filed March 24, 1937    7 Sheets-Sheet 3
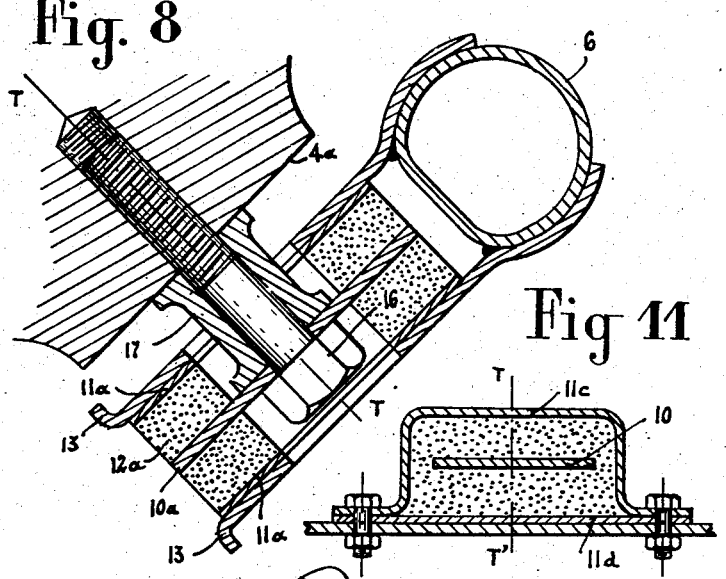
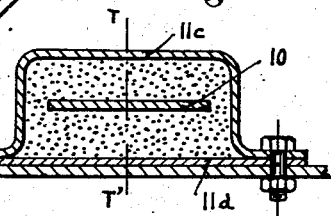
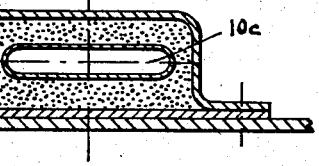
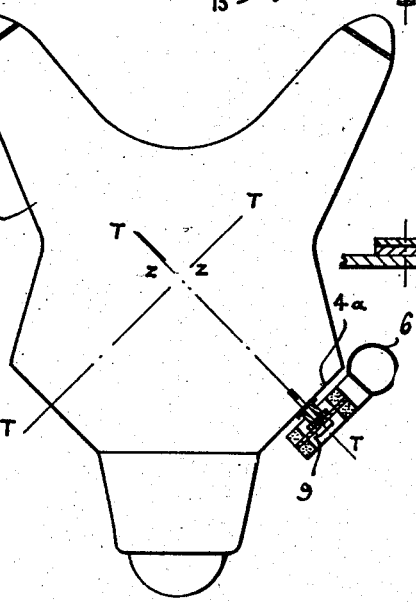

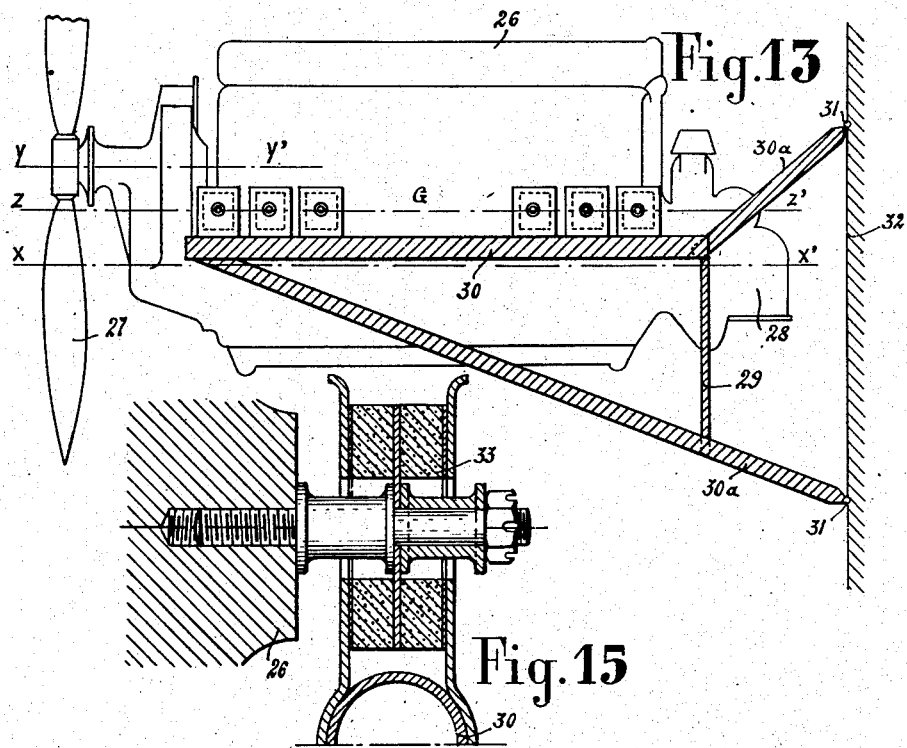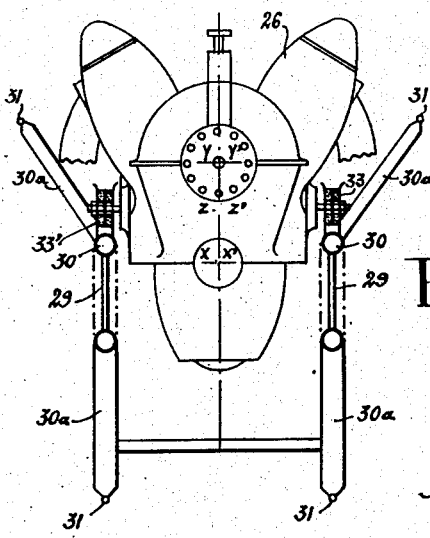

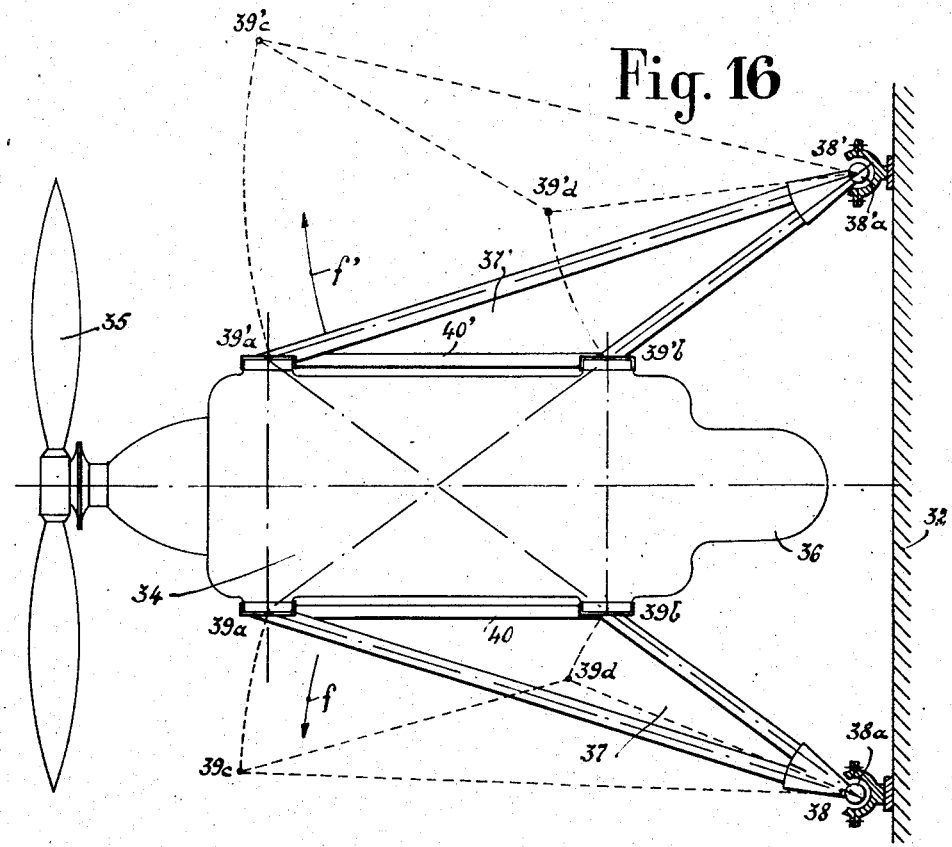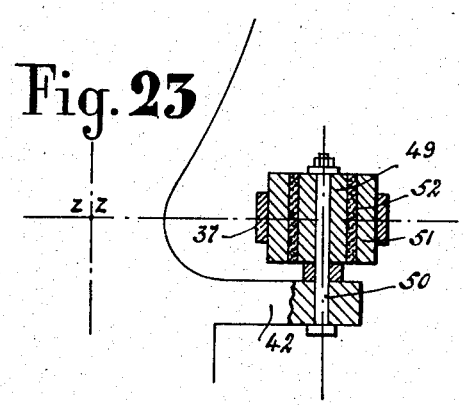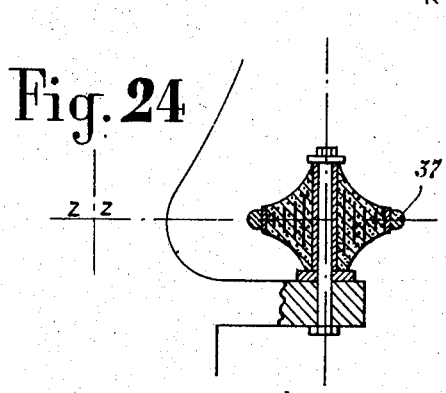

May 6, 1941.  M. F. A. JULIEN ET AL  2,241,139
ENGINE UNIT MOUNTING
Filed March 24, 1937  7 Sheets-Sheet 6
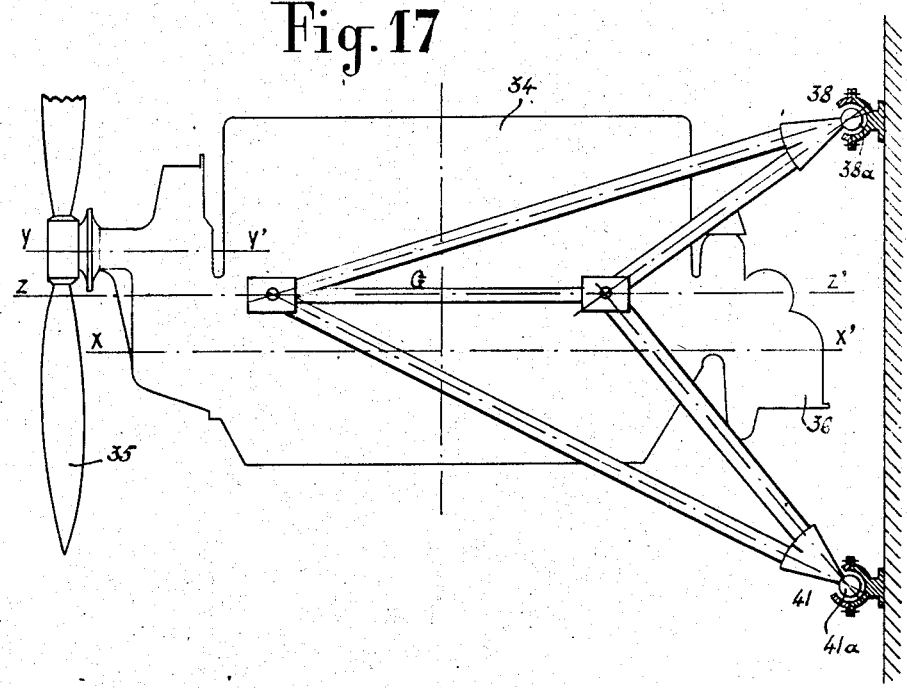
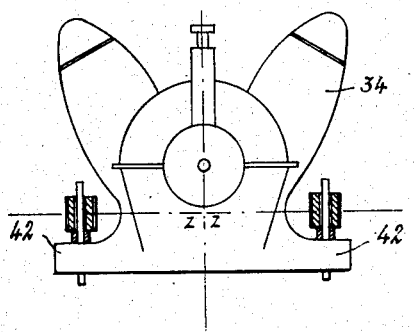
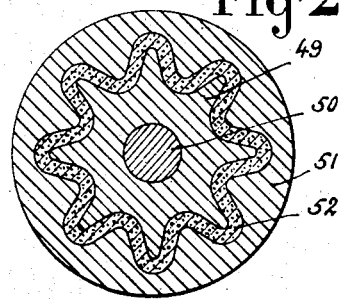

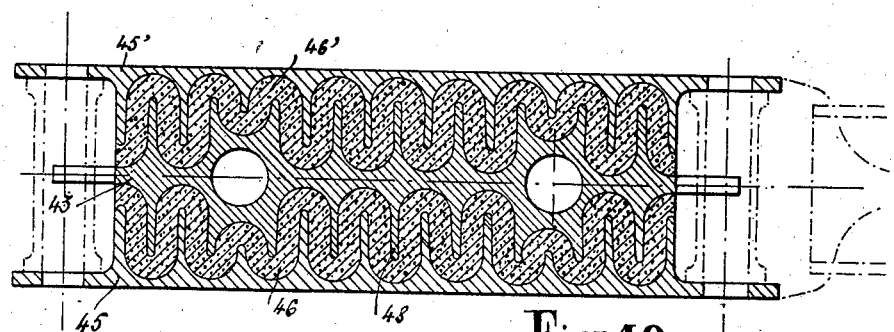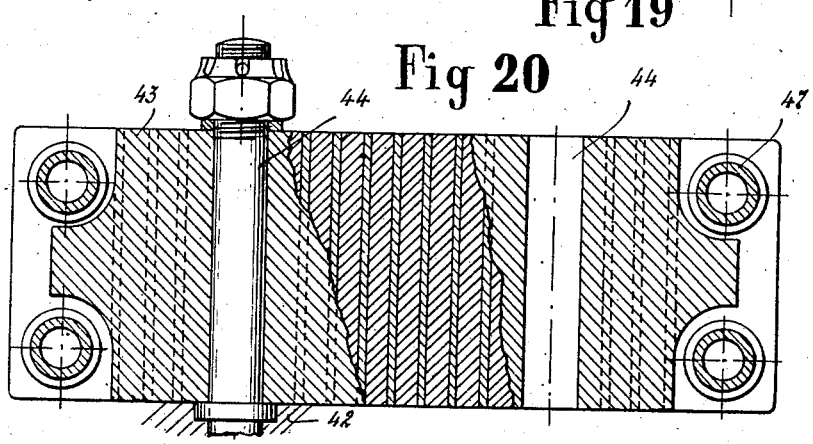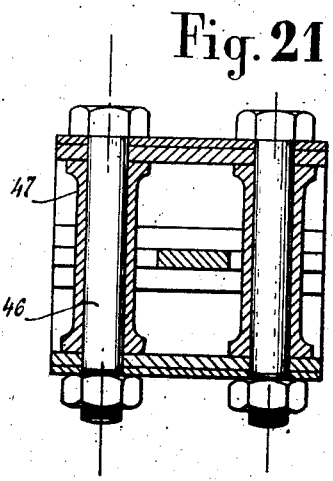

Patented May 6, 1941

2,241,139

UNITED STATES PATENT OFFICE 2,241,139

ENGINE UNIT MOUNTING

Maurice François Alexandre Julien, Paris, and Jean Felix Paulsen, Viroflay, France Application March 24, 1937, Serial No. 132,834
In France March 28, 1936

8 Claims. (Cl. 248—5)

This invention relates to mountings for internal combustion engines and has for its object to suppress or deaden the transmission of vibrations inherent in the operation of engines (and in general of all machines comprising parts actuated with an alternating or circular motion, in particular internal combustion engines) to the structures or frames which support the said machines or engines. The invention is applicable to any kind of frame or support of machine or engine whether in relation to mechanism in a fixed position or mounted on a movable apparatus: vehicle, boat, aeroplane, airship, etc.

In the case of internal combustion engines particularly, it has been known for a long time to allow to the engine with respect to its support (automobile chassis for example) a certain freedom of angular movement around an axis substantially parallel to the crankshaft. This freedom of movement is obtained by a resilient connection between the engine and the support.

On certain types of engines use has also been made for a certain time of a resilient mounting which further gives a freedom of angular oscillation around a horizontal axis perpendicular to the crankshaft and suitably chosen. In engine power plant the resultant of inertia of which is considerable and of relatively low frequency as in engines with 1, 2 and 4 cylinders and the centre of gravity of which is relatively far from the transverse plane of application of the resultant of inertia (case of an automobile engine block incorporating at one of its ends heavy members such as flywheel, clutch, differential, gear box) this suspension is shown to be particularly advantageous since under the action of this resultant of inertia these engines tend in fact to take up a well defined jumping (or galloping) movement.

But there exist other types of engines and other applications than automobile haulage where the putting into operation of the latter suspension would allow the most dangerous vibrations to exist and it is then contra-indicated.

This occurs particularly in the following cases.

1st case

The number of cylinders is high, greater than or equal to six for example. The resultant of inertia is firstly very small and secondly its frequency is very high (a multiple of that of the crankshaft). Its effect ceases by being completely masked by the forces of inertia of less frequency caused by errors or tolerances of balance in the moving parts, the distribution of which may be clearly of known type and variable from one engine to the other in the same group.

2nd case

The centre of gravity in the suspended block is sufficiently near the plane of application of the resultant of inertia. The engine then tends to vibrate radially and parallel to itself instead of oscillating angularly. This is in particular the case of most multi-cylinder aeroplane power plants where the mass of the propeller screw at one end substantially balances the associated parts of the engine such as the compressors, carburettors, distributors, valves, etc. at the opposite end.

3rd case

The conditions of use render it necessary to avoid jumping oscillations of the engine around a transverse axis. This is the case in aeroplane engines driving directly an adjacent propeller screw with or without reduction gear and the plane of rotation of which must remain unchanged with respect to the frame. In fact on account of the large inertia of the rotating masses any angular oscillation of the block gives rise to considerable gyroscopic reactions which may itself lead to the automatic maintenance of vibrations of the "shimmy" type.

The present invention envisages just these different cases and it consists in ensuring by means which will be hereinafter described and at least in certain embodiments, a freedom of radial oscillation of the engine on these supports following a natural tendency, by simple parallel translation of its points in directions perpendicular to the crankshaft.

The invention further seeks to prevent jumping oscillations, both those which are naturally produced and those which arise from a coupling with a radial oscillation as will be explained below.

Finally the invention ensures a certain longitudinal flexibility to the suspension parallel to the axis of the crankshaft, since although the engines may not themselves be the cause of longitudinal vibrations certain members connected to them, such as propeller screws for example may produce them, their pulling forces almost never being uniform on account of the pulsatory movement of the engine couple and the vibrations of mechanical or aerodynamic origin of the blades, released for example when one blade of the propeller screw passes at the level of a leading edge of a wing.

It will be understood that the invention is applicable not only to engines but to any alternating or rotating machine presenting the characteristics of the three cases mentioned above, that is to say: small resultant of inertia, at high frequency and passing close to the centre of gravity. But the invention will be described with respect to its application to aeroplane engines.

In its application to aeronautic power plants or to engines presenting similar dynamic characteristics the insulated suspension according to the invention comprises the use of a flexible connection obtained by means of resilient supports arranged between the engine and its frame, which connection is arranged and designed in such a way as to impose on the oscillation in six such a way as to impose on the oscillation in six degrees of freedom (three of translation, three of rotation) of the engine considered as a complex solid body of a gyroscope constituted by the rotating masses, suitable periods or frequencies and amplitudes of an order of magnitude defined as follows:

1. The angular oscillation of the group around a longitudinal axis parallel to the axis of the crankshaft and passing substantially through the centre of gravity is permitted with a weak resilient return means in such a way that the frequency of oscillation proper of the system, taking account of gyroscopic reactions may be low and cannot synchronise with the frequency of the driving impulses except at a speed of rotation less than that of its normal retardation.

2. The radial oscillation of the group (two degrees of freedom) by translation in directions substantially perpendicular to the longitudinal axis (the crankshaft) is permitted. For this purpose the supports are provided with a moderate radial elasticity, their longitudinal distribution and their individual flexibility being chosen in such a way that the resultant of the resilient reactions of the said supports for any displacement of radial translation of the block is substantially in the transverse plane containing the centre of gravity of the group. This is the condition in order that the radial oscillations may not be coupled to the jumping movement of the group and consequently the arrangement of the invention prevents a radial movement of the suspended masses from giving rise to a jumping movement.

3. The other angular oscillations of the block or jumping oscillations (two degrees of angular vertical and horizontal freedom) are practically prevented since the frequency proper of the transverse angular oscillation of the block is sufficiently increased, the engine rotating, that is to say taking into consideration gyroscopic reactions and by using one or several of the following means:

(a) The supports are longitudinally spaced out as much as possible and are preferably concentrated into two groups each comprising one or several supports and situated at the greatest possible distance from one another in the neighborhood of the ends of the block: the frequency of the jumping movement, all other things being equal, is in fact directly proportional to this spacing.

(b) The radial flexibility of the supports is chosen to be fairly small within the permitted limit in order to continue to ensure, within the conditions of use of the engine, a suitable insulation with respect to the residual forces of inertia which is small on account of the high frequency of these vibrations in multi-cylinder engines.

(c) The distribution of the radial elasticities satisfies the conditions summarised above in the 2nd case which has to effect, while suppressing the coupling between the jumping movement and the radial oscillation, of preventing the starting of the jumping movement by the resultant pulsatory of inertia.

4. The longitudinal oscillation of the group (three degrees of freedom of translation) parallel to the axis of the crankshaft is if necessary permitted with a weak resilient return motion and with a low characteristic frequency relative to the lowest frequencies of the engine in such as way as to ensure a good vibratory isolation even when slowing down, and use can preferably be made of an elastic return means with a force increasing with the displacements since the pulling force of the propeller screw increases with its speed of rotation at the same time that the frequency of most causes of vibration of which it is the seat. If for any reason this oscillation is not permissible, the supports are determined on the other hand in such a way so as to provide a very strong resilient longitudinal return means, the characteristic frequency of oscillation of the engine becoming greater than the greatest frequency used.

According to one preferred form of embodiment of the invention the resilient supports are constituted by rubber adhering to metal surfaces, some of which are integral with the engine, and the others with the support, but the invention is not restricted to this form of embodiment.

It must also be specified that it is not necessary to entrust all the elastic work in all directions to one kind of spring. On the contrary it will be advantageous in many cases to connect the engine resiliently for example to two rings situated at the ends, permitting for example radial oscillations and angular oscillations around the axis of the crankshaft, the said rings being themselves connected to the frame through resilient supports permitting a longitudinal displacement of the engine.

The attached drawings represent by way of example only some forms of embodiment of the invention without any descriptive limitation. On these drawings:

Figure 4 is a section along the line WW of Figure 6.

Figure 5 is a longitudinal section along the line VV of Figure 4.

Figure 6 is a side view of the support shown in Figure 4 looking in the direction of T—T with portions of the assembly removed.

Figure 7 is a modified form of engine suspension.

Figures 8 to 12 are details of construction of the engine suspension shown in Figure 7.

Figure 13 is a lateral view of an aeroplane engine showing a further modification of the invention.

Figure 14 is a transverse view in partial section of Figure 13.

Figure 15 is a detail of construction of the suspension.

Figure 16 is a diagrammatic plan view of a further embodiment of the invention.

Figure 17 is a side view of Figure 16.

Figure 18 is a diagrammatic transverse view in part section of Figure 16.

Figures 19, 20 and 21 are sections in plan, elevation with partial section and transverse view of a constructional detail.

Figures 22 and 23 are plan and cross sections of a modification of the suspension.

Figure 24 is a cross section of another modification.

Figure 1:
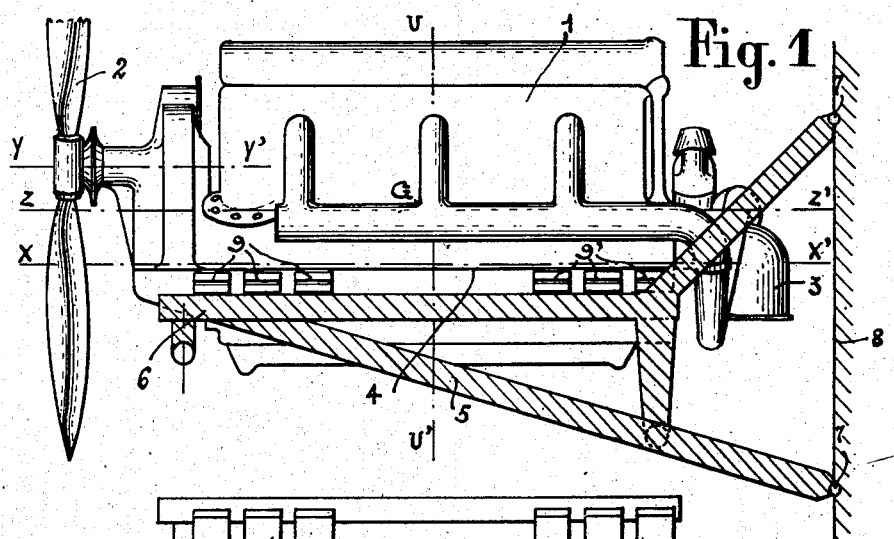
Figure 1 is a lateral view of an aeroplane engine unit.
Figure 3:
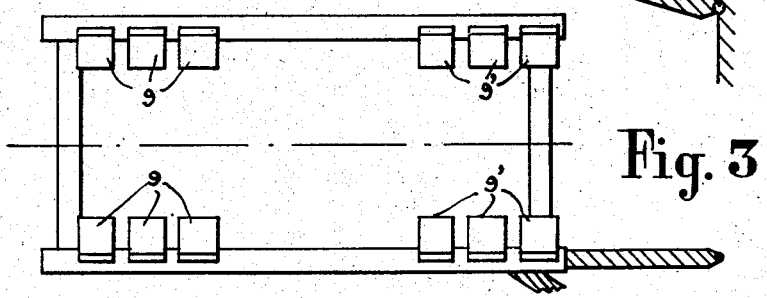
Figure 3 is a diagrammatic view in plan of the same unit.
Figure 2:
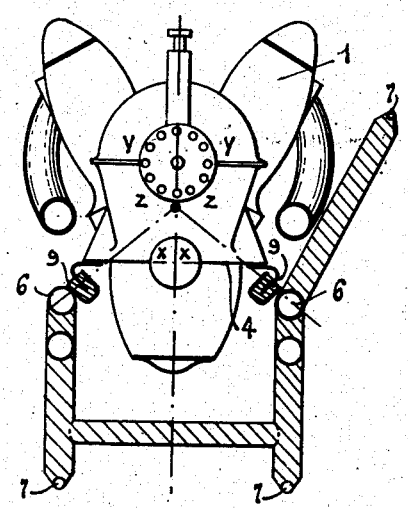
Figure 2 is a transverse view of the said engine unit in partial section.

In Figures 1, 2 and 3, 1 is an engine block integral with one end of a propeller screw 2 and carrying at its other end the engine parts 3 (carburettors, compressors, generators, distributors, pumps, etc.). The axis of the crankshaft is at XX' and that of the propeller screw at YY'. The axis ZZ' is parallel to the axis XX' and it passes through the centre of gravity G of the engine unit, the said centre of gravity on account of the distribution of the masses of the set being fairly near the transverse plane of symmetry of the crankshaft; which plane is indicated at UU' in Figure 1.

This engine unit is rendered integral with the aircraft by means of a known kind of framework or support 5 which comprises the longitudinal rails 6 on opposite sides of the platform 4 of the engine unit and securing devices 7 on the aeroplane structure 8.

In the suspension according to the invention the resilient supports 9, 9' are inserted between the platform 4 and the rails of the frame 6, the said supports being of any number but preferably arranged in two groups one in front 9, the other at the rear 9', separated as far as possible from each other and as permitted by the form of the frame and that of the engine.

A preferred embodiment of these supports is shown in the transverse section illustrated in Figure 4 and in Figure 5 which is a longitudinal section along the line TT' and in Figure 6 which is a view at right angles to Figure 4.

In this embodiment each support is constituted by a metal plate or member 10 integral with the engine platform 4, and metal plates or members 11 which are integral with the frame 6, the said plates being arranged opposite to each other and being separated by a layer of elastic material 12 such as rubber adhering strongly by moulding, vulcanisation or any other process to the opposing surfaces and constituting a permanent but elastic connection between these surfaces.

The planes of these surfaces are such that they are normal to the line TT' meeting at the longitudinal axis ZZ' which is parallel to the axis of the crankshaft of the engine and which passes through the centre of gravity as indicated at G. By this arrangement the tangential elasticity of the supports permits the movements of the engine in the longitudinal direction from the rear forwards and also its angular oscillation around the axis ZZ'. On the other hand the radial movements of the engine are only permitted by the normal compressions or extensions of the elastic material, that is to say in general with a smaller elastic load.

Figures 5, 8, 9 and 10 show further preferred embodiments for securing the members 10 and 11 on the engine or on the frame. In Figure 8 it is seen that the central plate 10a is secured by a bolt 16 and a reel shaped member 17 which bears on a boss or abutment face 4a of the engine. Figure 9 shows a front view of one of the plates of Figure 8 whilst Figure 10 is a section on line Q—Q of Figure 9 but with the addition of securing bolts and distance members. The outer plates 11a held separated by means of distance members 15 (Figure 5) and are secured by bolts 14 which pass through a box 13 which is integral with the rail of the frame 6. The central plate 10a and outer plates 11a are secured together by elastic material 12a as in the previous example given.

Figures 11 and 12 show an embodiment which gives to the supports an elasticity decreasing with the displacements from the rear forwards which is obtained by folding one of the outer plates 11c so as to bring it into contact with the other outer plate 11d, while closing the support at the front and at the rear. Similarly in theses conditions the resistance opposed to the displacement of the inner plate 10 can be increased by replacing it by a thicker member such as a flattened tube 10c (Figure 12).

In the example above described and shown the two groups of supports 9 and 9' (see Figure 1) comprise the same number of resilient supports and they are substantially equidistant from the centre of gravity G. By this arrangement the resultant of the elastic reactions pass substantially through the centre of gravity G, but it is obvious that this condition may be fulfilled in an infinite number of different ways by varying the spacing, the distribution and the elasticity of the supports.

In Figures 13 and 14, 26 is an engine block having a propeller screw 27 and the various accessories 28. The axis of the crankshaft is indicated at XX' and that of the propeller screw YY'. The axis ZZ' is parallel to the axis XX' and it passes through the centre of gravity G of the engine unit.

The engine unit is rendered integral with the aircraft by means of a frame or support 29 which comprises longitudinal rails 30 and triangulating rods 30a connecting the said rails 30 to attachment points 31 on the aircraft structure 32.

As in the previous modifications resilient supports 33, 33' are interposed between the engine and the chassis rails 30, the said supports being identical with those also shown in Figures 4, 5, 6 and 10 and distributed longitudinally in an identical manner (in detail in Figure 3).

It will be noted however that the said supports instead of being situated in any horizontal plane and mounted in an inclined manner so that the normals to their plane of preferential deformation is coincident with the axis ZZ', are in the present case situated substantially in the horizontal plane containing the axis ZZ' with their plane of preferential deformation placed vertically.

This arrangement ensures the same degree of freedom of oscillation of the engine as that provided in the previous modifications but this is, however, slightly increased in the freedom of movement of the engine in its vertical median plane (oscillations of vertical translations and of galloping movement around the transverse central axis of inertia).

It presents nevertheless the advantage of not introducing any horizontal forces tending to separate the two halves of the frame from one another, as occurs where the forces corresponding to the weight of the engine (multiplied by the coefficients in use in aeronautics) must for the calculation of resistance be resolved into forces parallel to the oblique plane of preferential deformation of the supports and into forces normal to the planes the horizontal components of which tend to open the frame; the plane of preferential deformation being in this case vertical as well as the forces due to the weight, and there are no horizontal components.

In Figures 16, 17 and 18, 34 is an engine block or unit integral having a propeller screw 35 and various accessories 36. The axis of the crankshaft is XX' and that of the propeller shaft is YY'. The axis ZZ' is parallel to the axis XX' and it passes through the centre of gravity G.

The supporting frame of known type comprises two symmetrical halves 37, 37', each formed by two triangles of tubes having a common base 38, 41 (see Figure 17) at their attachment to the aeroplane structure and of which the respective vertices 39a and 39b (39'a and 39'b) connected by a rail 40, 40' serve for attachment to four points of the engine unit on the assembly of the two frames. The attachments at 38, 38', 41, 41' are constituted by pivots 39a, 39'a, 41a, 41'a, of the roller kind so that each half frame is capable of pivoting in the horizontal plane around the hinge 38, 41 or 38', 41' in the direction of the arrows f or f' and can occupy an infinite number of positions such as is represented by 39c, 39d, 38 or 39'c, 39'd, 38' (Figure 16).

The attachment of such frames on engines such as 34 is generally effected rigidly to the points 39a, 39b, 39'a, 39'b, for example by means of bolts traversing simultaneously the frame 37 and an attachment claw of the engine 42 so that the rigidity of the casings invariably embodying diagonals 39a, 39b, and 39'a, 39'b, hold the assembly of the engine and the frame in a fixed position in the horizontal plane.

In the embodiment of the resilient suspension according to the invention, this invariability of the geometric arrangement of the frame is obtained by means of the following devices:

In the first place and as above, the resilient supports interposed at the points 39a, 39b, 39'a, 39'b are situated substantially in a horizontal plane containing the axis ZZ' passing through the centre of gravity of the suspended group and they are endowed with one direction of preferential deformation in the vertical direction and, on the other hand, have a rigidity as high as possible in all perpendicular directions, i. e. horizontally.

For this reason these supports will permit the angular oscillation of the engine around the axis ZZ' as well as oscillations in the vertical plane but they will vigorously oppose any horizontal zigzag movement of the engine and of the frame, the assembly of which will form a block provided with a very low transverse elasticity.

Figures 19 and 20 show a preferred form of embodiment of such supports. An inner metal frame 43 integral for example with the attachment claw 42 by means of vertical attachment bolts 44 is connected to each of the outer frames 45, 45' by a strip of rubber 46, 46' of substantially constant thickness, pressed, moulded and preferably rendered adhesive by vulcanisation to the faces opposite the said frames. The frames 45, 45' are themselves rendered integral with the framework 17, for example by means of bolts 46 and spacing reels 47 (Figure 21).

The rigidity in all directions of the horizontal plane is obtained by giving to the section of the frames 43 and 45, 45' the form represented in Figure 19 where projections in the form of teeth of a comb 48 of one of the frames penetrate into corresponding recesses in the other frame so that the strips of rubber 46 and 46' (undulated and folded back on themselves) operate under compression, that is to say with a very low elasticity in all horizontal directions of the plane section, whereas in the vertical direction (Figure 20) they operate under shear stress in uniform thickness, that is to say, with complete freedom of deformation and consequently with much greater elasticity.

This form of embodiment of the supports is moreover not exclusive. For example cylindrical supports may be provided such as those of Figures 22 and 23 wherein an inner grooved cylinder 49 is centred on the bolt 50 and an outer grooved cylinder 51 is integral with the frame 37; the interval of substantially constant size between the grooves of the cylinders being occupied by an undulated strip of adhesive rubber 52.

Similarly supports may be provided comprising a greater thickness of rubber and thus a greater vertical elasticity and such as described in the French specification filed May 15, 1936, by one of the applicants, wherein due to the insertion of a spiral sheeting of thin metal plate, their elasticity can be reduced as desired in all directions of the horizontal plane (see Figure 24).

We claim:

1. A mounting for resiliently supporting an aircraft engine, said mounting being arranged in longitudinal groups of resilient supports on the sides of said engine, said supports each comprising layers of elastic material having surfaces adhering to a part integral with the engine and surfaces adhering to a part integral with the engine support, one layer being in compression and the other in tension the said surfaces being normal to a plane which includes an axis passing through the centre of gravity of the engine and parallel to the crank-shaft of said engine.

2. A mounting for resiliently supporting an aircraft engine, said mounting being arranged in longitudinal groups of resilient supports on the sides of said engine, said supports each comprising layers of elastic material having surfaces adhering to a part integral with the engine and surfaces adhering to a part integral with engine support, one layer being in compression and the other in tension, the said surfaces being normal to a plane which includes an axis passing through the centre of gravity of the engine and parallel to the crank-shaft of the engine, said supports being distributed substantially equally from a transverse plane passing through the centre of gravity of the engine.

3. A mounting for resiliently supporting an aircraft engine, said mounting being arranged longitudinally on the sides of the engine and comprising groups of resilient supports, said groups being concentrated at the extremities of said longitudinal sides and each comprising layers of elastic material having surfaces adhering to a part integral with the engine and surfaces adhering to a part integral with the engine support, one layer being in compression and the other in tension, the surfaces of said supports being normal to a plane which includes an axis passing through the center of gravity of the engine and parallel to the crank-shaft of said engine.

4. A mounting for resiliently supporting an aircraft engine, said mounting including frame means symmetrically arranged with respect to the vertical longitudinal plane of the engine, groups of resilient supports on the sides of said engine, said supports each comprising layers of elastic material having surfaces adhering to a part integral with the engine and surfaces adhering to a part integral with said frame means, the said surfaces being normal to a plane which includes an axis passing through the centre of gravity of the engine and parallel to the crankshaft of the engine, one layer of elastic material being in compression and the other in tension.

5. A mounting for resiliently supporting an aircraft engine, said mounting being arranged in longitudinal groups of resilient supports each comprising an inner metal framework integral with the engine, an outer framework connected to the engine support, and strips of elastic material of a constant thickness having surfaces adhering to said frameworks, said frameworks having parts overlapping each other so that the strip of elastic material has an undulating cross-section, the adhering surfaces of said supports being arranged normal to a plane which includes an axis passing through the centre of gravity of the engine and parallel to the crank-shaft of the engine one of said strips being in compression and the other in tension.

6. A mounting for resiliently supporting an aircraft engine, said mounting comprising an inner cylindrical element, an outer cylindrical element, complementary grooves and projections on said elements, a layer of elastic material having surfaces adhering to said inner and outer elements and extending between the grooves and projections, the inner cylindrical element being connected to the engine and the outer cylindrical element being connected to the engine support, said supporting elements being arranged with their adhering surfaces normal to a plane which includes an axis passing through the centre of gravity of the engine and parallel to the crank-shaft of the engine.

7. A mounting for resiliently supporting an aircraft engine, said mounting comprising an inner bush, an outer bush, the inner bush connected to the engine and the outer bush connected to the engine support, a ring of elastic material adhering to adjacent faces of said inner and outer bushes, said mounting having a radial elasticity, spiral laminations embedded in the elastic material limiting the said radial elasticity, said supporting elements having surfaces arranged normal to a plane which includes an axis passing through the centre of gravity of the engine and parallel to the crank-shaft of the engine.

8. A mounting for resiliently supporting an aircraft engine comprising a plurality of supports of elastic material having surfaces adhering to parts integral with the engine and surfaces adhering to parts integral with the engine support, said supports being arranged in groups with their adhering surfaces normal to a plane which includes an axis passing through the centre of gravity of the engine and parallel to the crank-shaft of said engine said elastic supports being partly in compression and partly in tension.

MAURICE FRANÇOIS ALEXANDRE JULIEN.
JEAN FELIX PAULSEN.